Nov. 5, 1929.  H. MARLES  1,734,222
BEARING
Filed Dec. 27, 1927
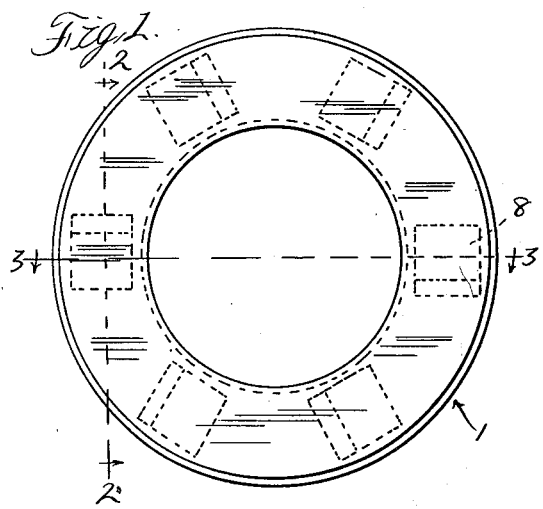
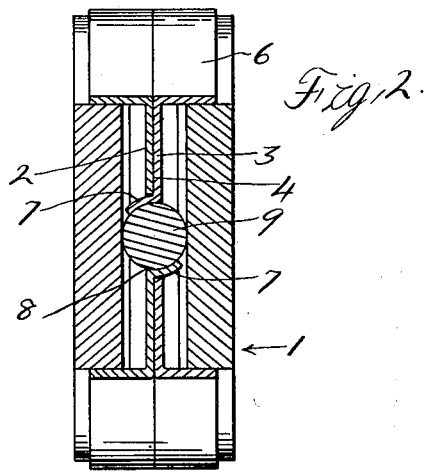
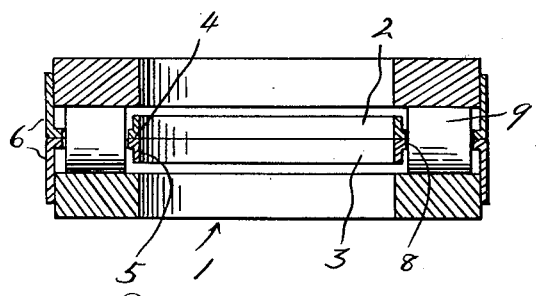
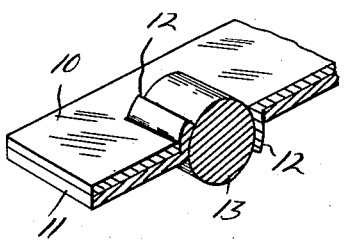
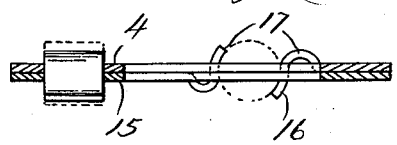
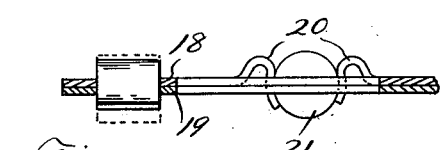
Inventor
Henry Marles Patented Nov. 5, 1929

1,734,222

UNITED STATES PATENT OFFICE

HENRY MARLES, OF DETROIT, MICHIGAN

BEARING

Application filed December 27, 1927. Serial No. 242,772.

This invention relates generally to bearings and refers more particularly to roller bearings. One of the primary objects of the invention is to provide a roller bearing so constructed that the cage sections which normally retain the rollers in operative position are in turn secured in abutting relation by the rollers themselves.

With the above and other objects in view, the invention consists in certain novel features of construction, combinations and arrangements of parts as will be more fully described and particularly pointed out in the appended claims.

In the accompanying drawings:

Figure 1 is a side elevation of a roller bearing embodying my invention;

Figure 2 is a section taken on line 2—2 of Figure 1;

Figure 3 is a section taken on line 3—3 of Figure 1;

Figure 4 is a perspective view of a slightly modified form of the invention in which straight cage sections are substituted in place of circular ones;

Figure 5 is another modification of the bearing;

Figure 6 is still another modification showing the tongues projecting from one cage section only.

Referring now to the construction disclosed in Figures 1 to 3 of the drawing, the numeral 1 designates a roller bearing comprising complementary cage sections 2 and 3, each of which is provided with a flat circular face portion 4 and inner and outer annular flanges 5 and 6 respectively. Each cage section 2 is provided with a plurality of curved tongues 7 which are struck out from the flat face 4 and which project outwardly therefrom. It will be apparent that the striking out operation also forms a plurality of openings 8 adjacent to each tongue through which a tongue of the complementary section is adapted to project when the faces 4 are placed in abutting relation with the said openings in registration.

Referring to Figure 2, it will be seen that with the cage sections so positioned with a tongue of one section projecting through an opening in the other section, that the tongues when spaced as far apart as possible, will cooperate to form a roller retaining member within which a roller 9 may be easily inserted. Because of the curved form of the tongues, it will be necessary to spring each roller into engagement with its corresponding pair of tongues but once the rollers are in position they will be securely retained between the tongues, and it will be necessary to exert a certain amount of force to remove them from the cage. It will of course, be apparent that the tongues may be opened sufficiently to insert the rollers and afterwards bend them back into place to retain the rollers in position.

The arrangement of the several parts is such that while the rollers are retained in position by the tongues, these rollers will also keep each set of tongues spaced apart and because of the particular form of the tongues the force exerted against them by each roller will tend to retain the faces 4 in abutting relation and thus hold the cage sections in operative position, without the use of additional attaching means such as bolts, screws or rivets.

In Figure 4 there is illustrated a slightly modified form of bearing in which the cage sections comprise a pair of perfectly straight metallic strips 10 and 11 having tongues 12 for retaining the roller 13 in a manner similar to that just described.

Figure 5 discloses a bearing having circular cage sections 14 and 15 in which the tongues 16 are provided with humps or return bent portions 17 and in which the annular flanges are discarded.

In Figure 6 the cage sections 18 and 19 are somewhat similar to those of Figure 5 with the exception that the tongues 20 for retaining the rollers 21 are all positioned upon one section only. With this construction it is of course necessary to provide means (not shown) for fastening the cage sections together.

From the foregoing it will be apparent that I have provided a simply constructed roller bearing which may be quickly and easily assembled and in which, in all instances except one, the rollers are adapted to retain the cage sections in operable position.

What I claim as my invention is:

1. An anti-friction bearing comprising a cage consisting of a pair of sections having flat annular faces in abutting relation, and rollers carried by said cage and adapted to retain said sections in abutting relation.

2. An anti-friction bearing comprising a cage consisting of a pair of abutting sections, each section having an opening registering with the opening in the other section, and rollers carried by said sections and retained within said openings, said rollers securing said cage sections in abutting relation.

3. An anti-friction bearing comprising a cage consisting of two sections, each section being provided with a projection cooperating with the projection of the other section to form a roller retaining member, and a roller insertable between said projections and adapted to secure said cage sections in operable position.

4. An anti-friction bearing comprising a cage consisting of two abutting sections, each section having a projection extending through an opening in the other section, and a roller retained between said projections and being adapted to secure said cage sections in abutting relation.

5. An anti-friction bearing comprising a cage consisting of two sections, each section having a struck out tongue projecting through an opening in the other section and cooperating with the projection of the other section to form a roller retaining member, and a roller retained between said tongues and adapted to secure said cage sections in operable position.

6. An anti-friction bearing comprising a cage consisting of two sections, each section having a laterally projecting curved tongue cooperating with the tongue of the other section to form a roller retaining member, and a roller retained between said tongues and adapted to secure said cage sections in operable position.

7. An anti-friction bearing comprising a cage consisting of two sections, said sections being provided with oppositely projecting tongues cooperating to form roller retaining members, and rollers retained between said tongues and adapted to secure said sections in operable position.

8. An anti-friction bearing comprising a cage consisting of a pair of abutting sections, each section having an opening registering with the opening in the other section, rollers positioned in said openings, and means on each section cooperating with the means on the other section for retaining the rollers in said openings, said rollers securing said cage sections in abutting relation.

In testimony whereof I affix my signature.
HENRY MARLES.